(12) United States Patent
Johansen et al.

(10) Patent No.: US 9,619,843 B2
(45) Date of Patent: *Apr. 11, 2017

(54) PROVIDING E-RECEIPTS TO CUSTOMERS

(71) Applicant: BANK OF AMERICA CORPORATION, Charlotte, NC (US)

(72) Inventors: Joseph Neil Johansen, Rock Hill, SC (US); Farhan Ahmed Siddiqi, Charlotte, NC (US); David Reed Godsman, Charlotte, NC (US); David M. Grigg, Rock Hill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,988

(22) Filed: Feb. 11, 2016

(65) Prior Publication Data
US 2016/0162998 A1    Jun. 9, 2016

Related U.S. Application Data

(63) Continuation of application No. 14/280,112, filed on May 16, 2014, now Pat. No. 9,275,418.

(51) Int. Cl.
| | |
|---|---|
| *G06K 15/00* | (2006.01) |
| *G06Q 40/00* | (2012.01) |
| *G06Q 30/04* | (2012.01) |
| *G06Q 30/06* | (2012.01) |
| *G06Q 40/02* | (2012.01) |
| *G06Q 20/20* | (2012.01) |

(52) U.S. Cl.
CPC ........... *G06Q 40/12* (2013.12); *G06Q 20/202* (2013.01); *G06Q 30/04* (2013.01); *G06Q 30/06* (2013.01); *G06Q 40/02* (2013.01)

(58) Field of Classification Search
CPC .................................................... G06Q 20/209
USPC ............................................ 235/383; 705/24
See application file for complete search history.

(56) References Cited

U.S. PATENT DOCUMENTS

| | | | |
|---|---|---|---|
| 6,947,908 | B1 | 9/2005 | Slater |
| 8,296,229 | B1 | 10/2012 | Yellin et al. |
| 2007/0069013 | A1 | 3/2007 | Seifert et al. |
| 2010/0125522 | A1 | 5/2010 | Thomas |
| 2010/0257066 | A1 | 10/2010 | Jones |
| 2011/0145148 | A1 | 6/2011 | Hammad |
| 2011/0191173 | A1 | 8/2011 | Blackhurst et al. |

(Continued)

*Primary Examiner* — Jamara Franklin
(74) *Attorney, Agent, or Firm* — Michael A. Springs; Moore & Van Allen PLLC; W. Kevin Ransom

(57) ABSTRACT

Embodiments of the invention relate to systems, methods, and computer program products for providing e-receipts to customers. Embodiments receive authorization from a customer for the customer to be enrolled in a point of transaction e-receipt communication program; receive transaction data corresponding to at least one transaction performed by the customer at a point of transaction of a merchant; and initiate communication, to the customer, of an e-receipt based at least in part on the received transaction data. Some embodiments receive authorization from a plurality of enrolling merchants for enrollment in the point of transaction e-receipt communication program; and build a cooperating merchant list comprising information corresponding to a plurality of cooperating merchants cooperating with a financial institution implementing the point of transaction e-receipt communication program.

10 Claims, 8 Drawing Sheets

(56) References Cited

U.S. PATENT DOCUMENTS

| | | |
|---|---|---|
| 2011/0191177 A1 | 8/2011 | Blackhurst et al. |
| 2011/0238499 A1 | 9/2011 | Blackhurst et al. |
| 2012/0197742 A1 | 8/2012 | Johnson |
| 2012/0203644 A1 | 8/2012 | Phillips |
| 2012/0221446 A1 | 8/2012 | Grigg et al. |
| 2013/0080232 A1 | 3/2013 | Fisher |
| 2013/0080240 A1 | 3/2013 | Fisher |
| 2013/0110659 A1 | 5/2013 | Phillips et al. |
| 2013/0124351 A1 | 5/2013 | Fisher |
| 2013/0198018 A1 | 8/2013 | Baig |
| 2013/0282470 A1 | 10/2013 | Schwarzkopf et al. |
| 2016/0162997 A1 | 6/2016 | Johansen et al. |
| 2016/0162999 A1 | 6/2016 | Johansen et al. |

300
302
306

FINANCIAL INSTITUTION NAME                                      DATE

YOUR ONLINE TRANSFER OF $XXX.XX TO XXXXXXX (ACCOUNT HOLDER OF ACCOUNT # XXXXXXX) WAS SUCCESSFULLY COMPLETED ON XX/XX/XXXX

TRANSFER DETAILS

| | |
|---|---|
| 304 — AMOUNT | XXX.XX |
| 308 — RECIPIENT | XXXXXXX |
| 310 — REMAINING BALANCE | XXX.XX |
| 312 — MEMO | RENT |
| 314 — FREQUENCY OF OCCURRENCE | EVERY MONTH |

WE NOTICED THAT YOU REGULARLY TRANSFER $XXX.XX TO THIS RECIPIENT ONCE A MONTH. WOULD YOU LIKE TO:
    (A) SCHEDULE AN AUTOMATIC PAYMENT?
    (B) CATEGORIZE THIS TRANSFER IN YOUR ONLINE BUDGET?

RETURN TO TRANSFERS PAGE

| | 400 | 402 | 410 | 404 | 412 | 414 | 406 |
|---|---|---|---|---|---|---|---|
| | ACCOUNTS | | | TRANSFERS | | CUSTOMER SERVICE | |

| ? | DATE | DESCRIPTION | AMOUNT | BALANCE |
|---|---|---|---|---|
| | PROCESSING | TRANSFER TO ACCT # XXXX | XX.XX | XXX.XX |
| | PROCESSING | CREDIT FROM ACCT # XXXX | XX.XX | XXX.XX |
| X | PROCESSING | EXTERNAL TRANSFER | XX.XX | XXX.XX |
| | XX/XX/XXXX | TRANSFER TO ACCT # XXXX | XX.XX | XXX.XX |
| | XX/XX/XXXX | ONLINE PAYMENT | XX.XX | XXX.XX |
| | XX/XX/XXXX | TRANSFER TO ACCT # XXXX | XX.XX | XXX.XX |
| | XX/XX/XXXX | TRANSFER TO ACCT # XXXX | XX.XX | XXX.XX |
| | XX/XX/XXXX | EXTERNAL TRANSFER | XX.XX | XXX.XX |
| | XX/XX/XXXX | CREDIT FROM ACCT # XXXX | XX.XX | XXX.XX |
| | XX/XX/XXXX | TRANSFER TO ACCT # XXXX | XX.XX | XXX.XX |

408

416

418 — INFORMATION ON SELECTED TRANSACTION

WE HAVE DETERMINED THAT THE EXTERNAL TRANSFER (CREDIT) OF XX.XX THAT IS CURRENTLY PENDING WAS TRANSFERRED FROM FINANCIAL INSTITUTION X. THE METADATA FROM FINANCIAL INSTITUTION X INDICATES THAT THE TRANSFEROR INPUT A MEMO OF "FOR BIRTHDAY"

FIG. 4

PROVIDING E-RECEIPTS TO CUSTOMERS

CROSS-REFERENCE TO RELATED APPLICATIONS

This application is a continuation of U.S. patent application Ser. No. 14/280,112, filed May 16, 2014; the contents of which are hereby incorporated by reference

BACKGROUND

Financial institutions desire to provide appropriate and helpful guidance to customers regarding their financial affairs. One way that financial institutions assist customers is by facilitating online banking transactions, such as online transfers, online bill pays, purchases of stocks or bonds, and other types of online banking transactions. Financial institutions are continually seeking new and innovative methods of improving the customer experience, including the customer experience of online banking transactions.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

According to an embodiment of the invention, a financial institution system for providing e-receipts to customers includes a computer apparatus including a processor and a memory; and a software module stored in the memory, comprising executable instructions that when executed by the processor cause the processor to receive authorization from a customer for the customer to be enrolled in a point of transaction e-receipt communication program; receive transaction data corresponding to at least one transaction performed by the customer at a point of transaction of a merchant; and initiate communication, to the customer, of an e-receipt based at least in part on the received transaction data.

In some embodiments, the executable instructions further cause the processor to request authorization from the customer for the customer to be enrolled in the point of transaction e-receipt communication program.

In some embodiments, the transaction data is received as an e-receipt generated by the merchant and based on the at least one transaction performed by the customer at the point of transaction of the merchant.

In some embodiments, the executable instructions further cause the processor to access a cooperating merchant list comprising information corresponding to a plurality of merchants cooperating with a financial institution implementing the point of transaction e-receipt communication program; and for each of the plurality of cooperating merchants, request authorization from the customer for transaction data associated with any transactions performed by the customer at the cooperating merchant to be communicated to the financial institution for the purpose of providing e-receipts to the customer.

In some embodiments, the customer's authorization for the customer to be enrolled in the point of transaction e-receipt communication program is received from an online banking session of the customer.

In some embodiments, the customer's authorization for the customer to be enrolled in the point of transaction e-receipt communication program is received from a mobile application session of the customer.

In some embodiments, the executable instructions further cause the processor to receive authorization from a plurality of enrolling merchants for enrollment in the point of transaction e-receipt communication program; and build, based at least in part on the plurality of enrolling merchants, a cooperating merchant list comprising information corresponding to a plurality of cooperating merchants cooperating with a financial institution implementing the point of transaction e-receipt communication program.

In some embodiments, the executable instructions further cause the processor to receive customer identification information from the merchant; access a participating customer list comprising information corresponding to a plurality of customers participating in the point of transaction e-receipt communication program; determine whether the received customer identification information corresponds to any of the plurality of customers in the participating customer list; if so, initiate communication of a confirmation message to the merchant indicating to the merchant that the customer is participating in the point of transaction e-receipt communication program; and wherein the transaction data is received from the merchant in response to the merchant receiving the confirmation message.

In some embodiments, the executable instructions further cause the processor to receive customer identification information comprising loyalty account information from the merchant; determining an identity of the customer based at least in part on the loyalty account information received from the merchant; and wherein initiating communication of the e-receipt to the customer is based at least in part on the determined identity of the customer.

In some embodiments, the transaction data corresponds to a cash transaction performed by the customer with the merchant and wherein the executable instructions further cause the processor to receive identification information corresponding to an identity of the customer; associate the transaction data with the identity of the customer; generate the e-receipt based on the associated transaction data and identity of the customer; and wherein initiating communication of the e-receipt to the customer is based at least in part on the determined identity of the customer.

In some embodiments, initiating communication of the e-receipt to the customer comprises initiating communication of the e-receipt to an email address associated with the customer, to an online banking repository associated with the customer and to a mobile application repository associated with the customer.

In some embodiments, the executable instructions further cause the processor to receive, from an online banking session of the customer, a request for an e-receipt associated with the at least one transaction; and wherein initiating communication of the e-receipt to the customer is in response to receiving the request.

In some embodiments, the executable instructions further cause the processor to receive, from a mobile application session of the customer, a request for an e-receipt associated with the at least one transaction; and wherein initiating communication of the e-receipt to the customer is in response to receiving the request.

According to an embodiment of the invention, a computer program product for generating an e-receipt for an online banking transaction, the computer program product comprising a non-transitory computer readable storage medium having computer readable program code embodied therewith, the computer readable program code comprising a computer readable program code configured to receive authorization from a customer for the customer to be enrolled in a point of transaction e-receipt communication program; receive transaction data corresponding to at least one transaction performed by the customer at a point of transaction of a merchant; and initiate communication, to the customer, of an e-receipt based at least in part on the received transaction data.

In some embodiments, the computer readable program code is further configured to request authorization from the customer for the customer to be enrolled in the point of transaction e-receipt communication program.

In some embodiments, the transaction data is received as an e-receipt generated by the merchant and based on the at least one transaction performed by the customer at the point of transaction of the merchant.

In some embodiments, the computer readable program code is further configured to access a cooperating merchant list comprising information corresponding to a plurality of merchants cooperating with a financial institution implementing the point of transaction e-receipt communication program; and for each of the plurality of cooperating merchants, request authorization from the customer for transaction data associated with any transactions performed by the customer at the cooperating merchant to be communicated to the financial institution for the purpose of providing e-receipts to the customer.

In some embodiments, the customer's authorization for the customer to be enrolled in the point of transaction e-receipt communication program is received from an online banking session of the customer.

In some embodiments, the customer's authorization for the customer to be enrolled in the point of transaction e-receipt communication program is received from a mobile application session of the customer.

According to an embodiment of the invention, a method for providing an e-receipt to a customer includes receiving, at a processor of a financial institution system, authorization from a customer for the customer to be enrolled in a point of transaction e-receipt communication program; receiving, at the processor of the financial institution system and from a merchant, transaction data corresponding to at least one transaction performed by the customer at a point of transaction of a merchant; and initiating communication, by the processor of the financial institution system and to the customer, of an e-receipt based at least in part on the received transaction data.

Other aspects and features, as recited by the claims, will become apparent to those skilled in the art upon review of the following non-limited detailed description of the invention in conjunction with the accompanying figures.

BRIEF DESCRIPTION OF THE DRAWINGS

Figure 1:
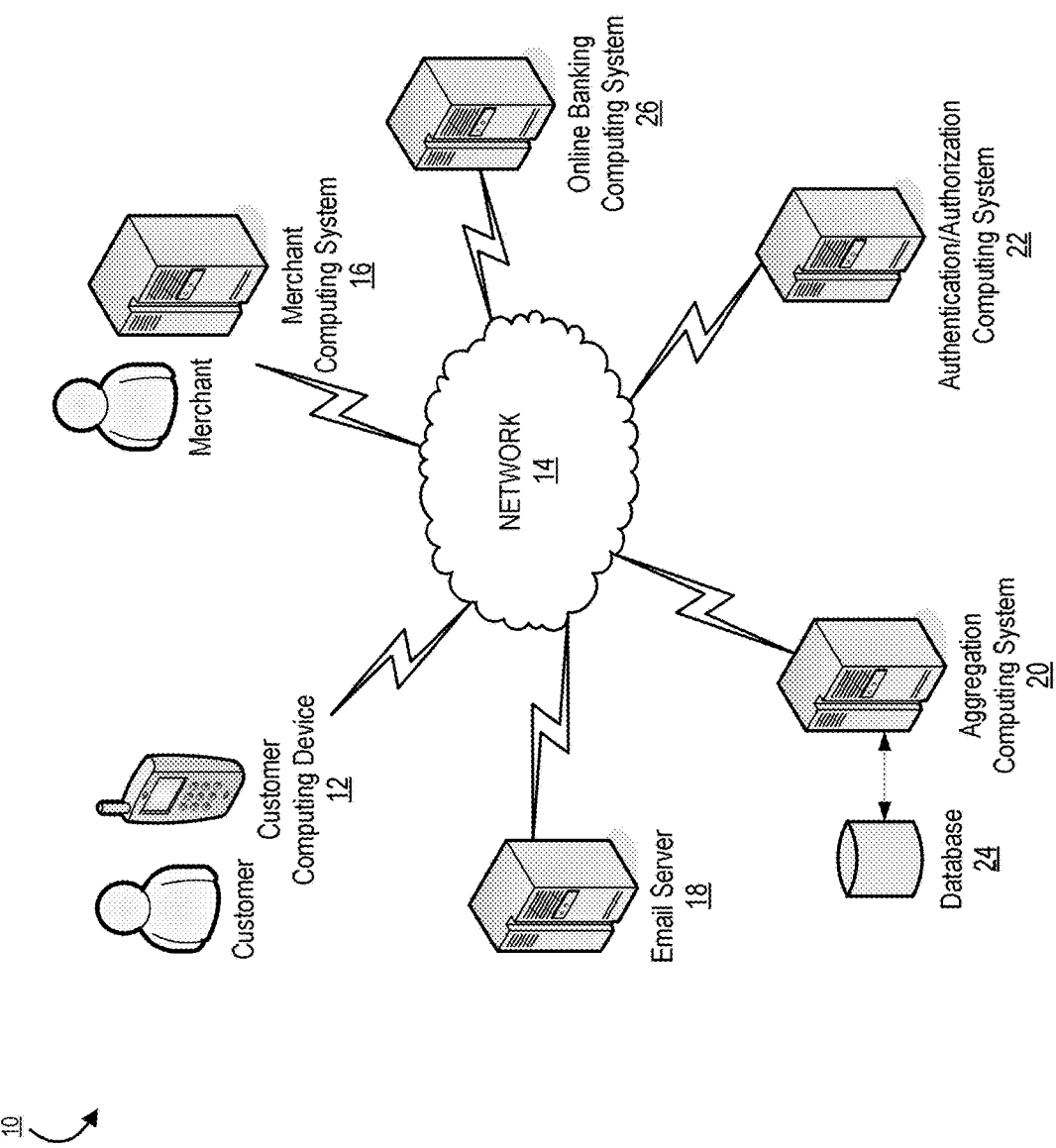
Figure 2:
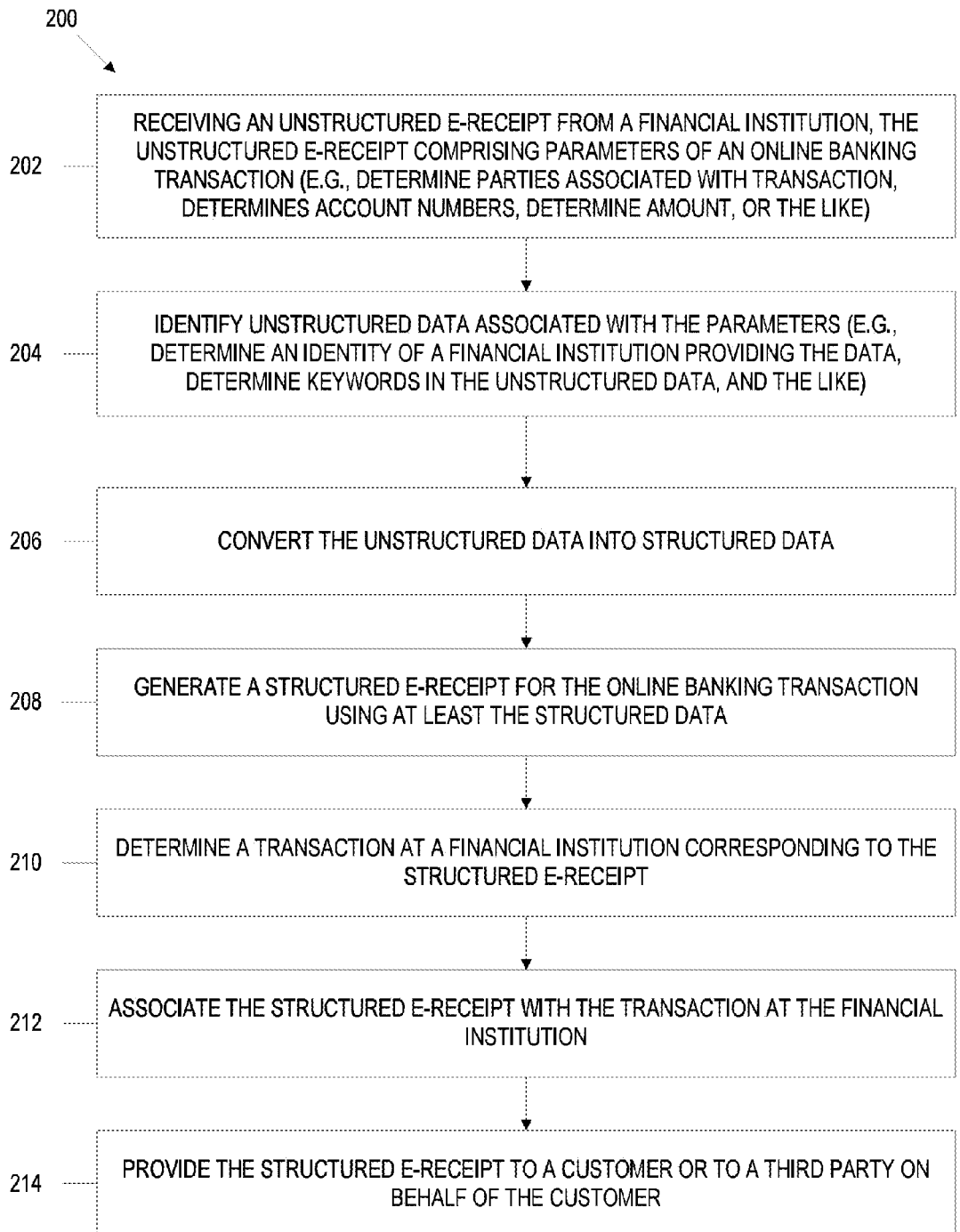
Figure 5:
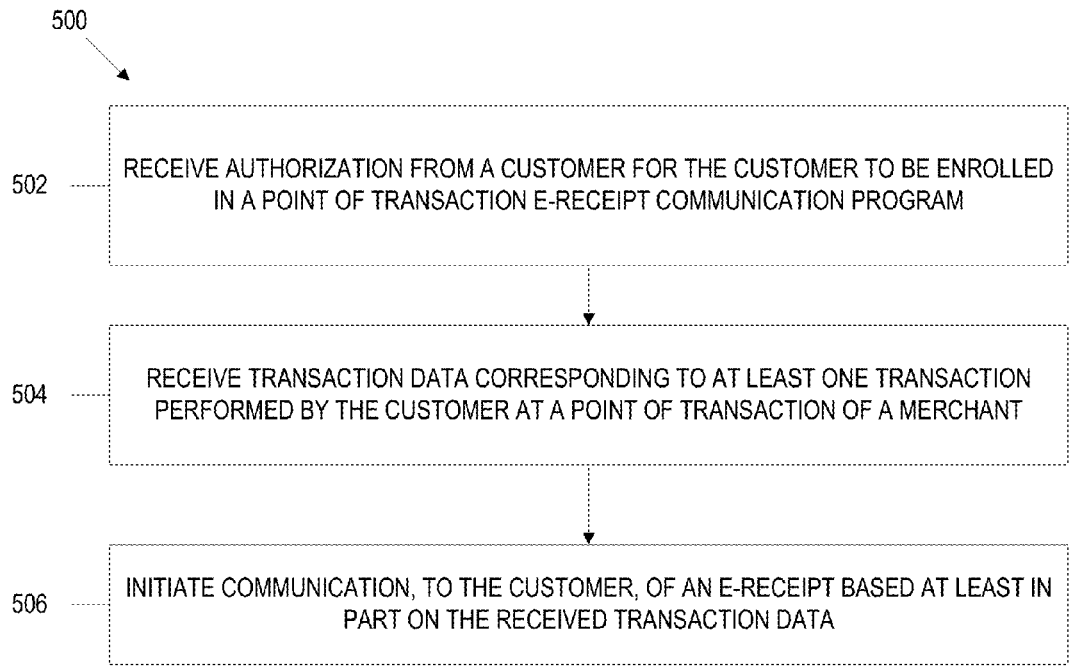
Figure 6:
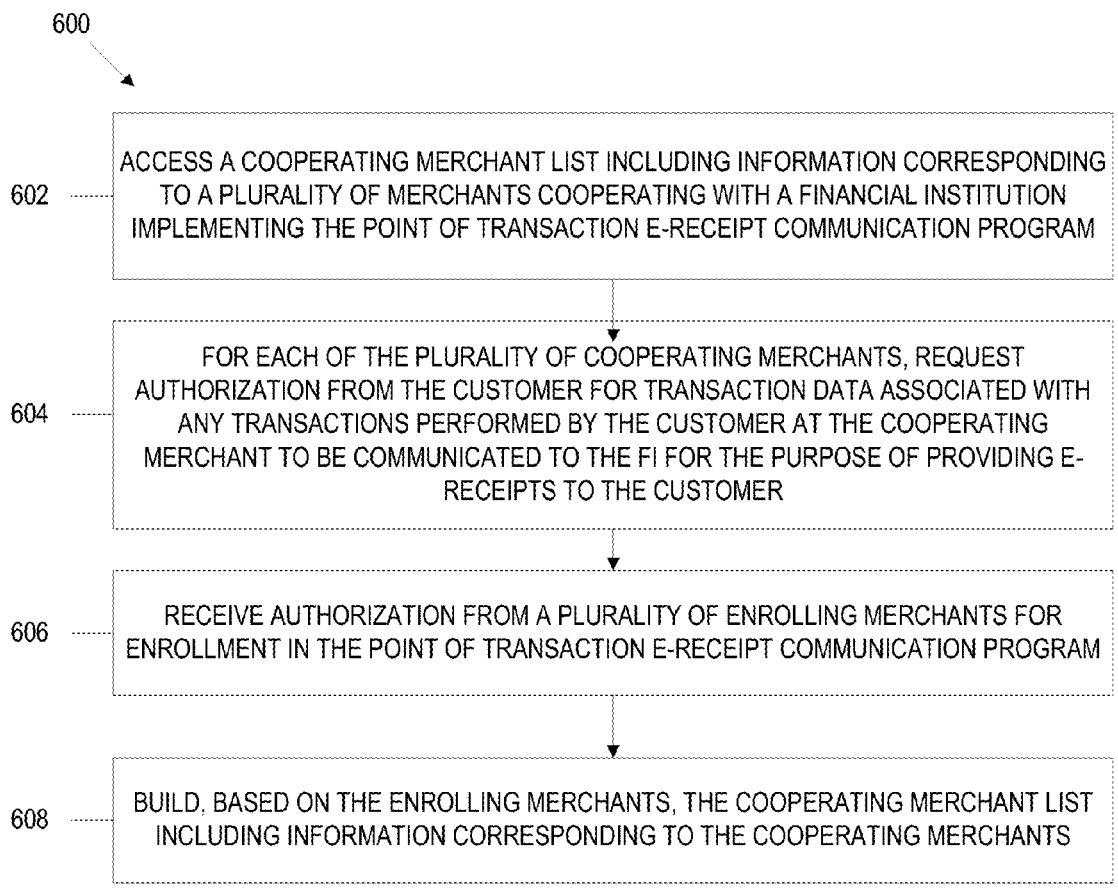
Figure 7:
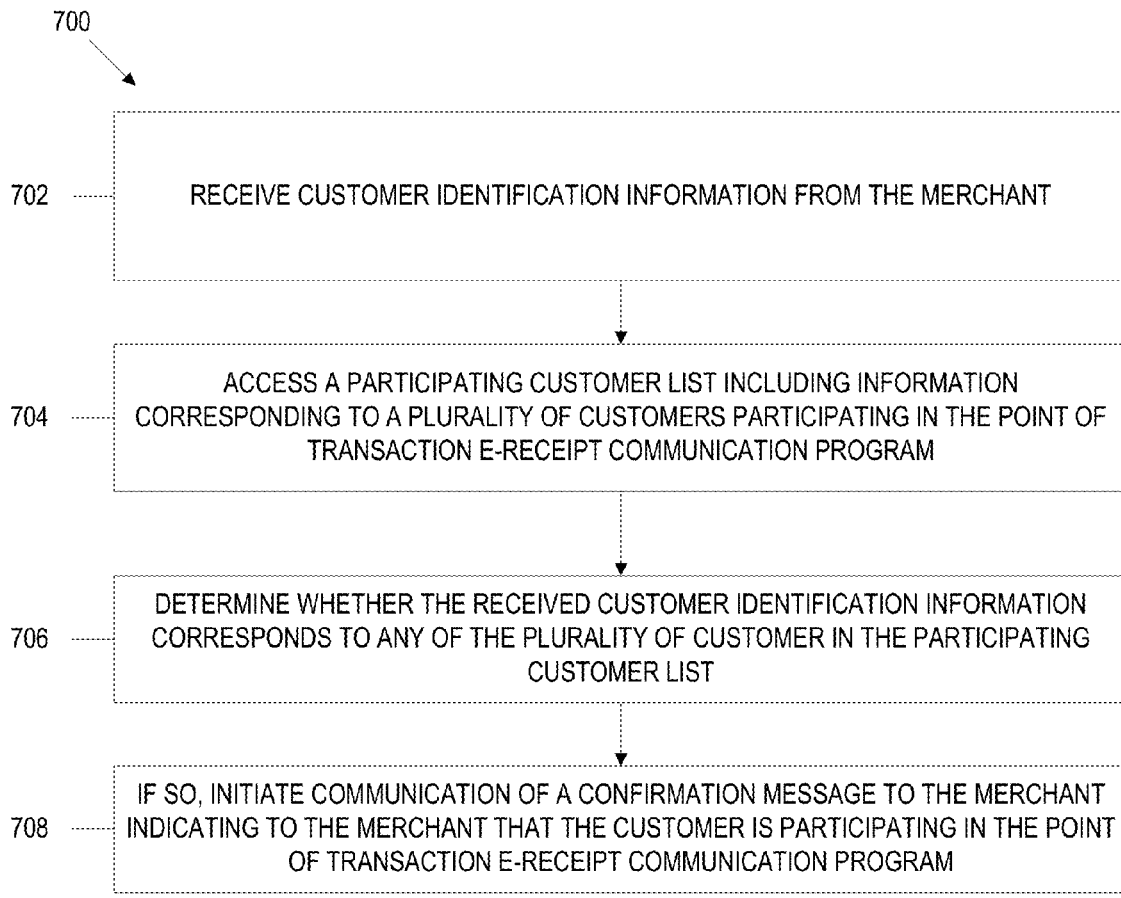
Figure 8:
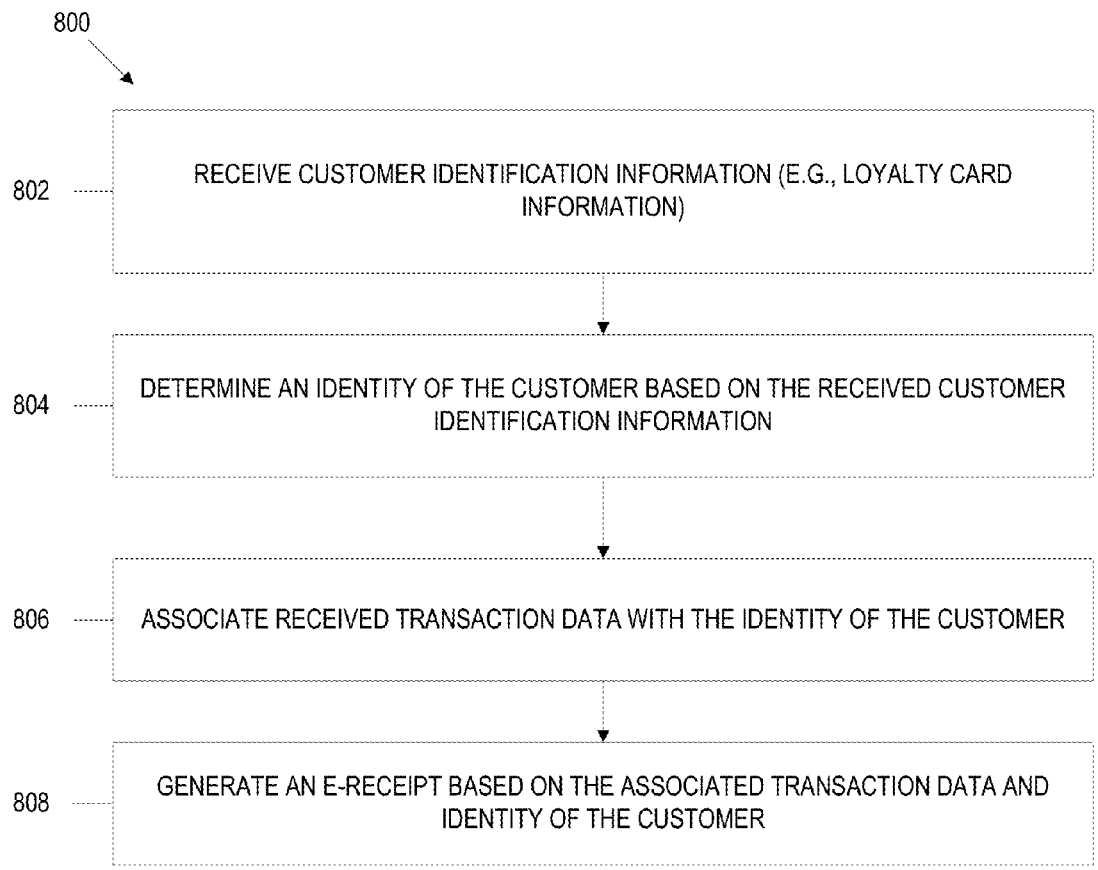

Having thus described embodiments of the invention in general terms, reference will now be made to the accompanying drawings, which are not necessarily drawn to scale, and wherein:

FIG. 1 is a diagram of an operating environment according to one embodiment of the present invention for retrieval of electronic communications relating to customer purchase transactions, parsing of data within such electronic communications into structured data, and inclusion of such data into online banking;

FIG. 2 provides a high level process flow illustrating a method of providing an e-receipt for an online banking transaction, in accordance with one embodiment of the present disclosure;

FIG. 3 is an exemplary embodiment of an e-receipt associated with the method, in accordance with embodiments of the disclosure;

FIG. 4 is an exemplary embodiment of an account register associated with the method, in accordance with embodiments of the disclosure;

FIG. 5 is a flowchart illustrating a method for providing e-receipts to customers, in accordance with embodiments of the disclosure;

FIG. 6 is a flowchart illustrating a method for providing e-receipts to customers, in accordance with embodiments of the disclosure using a cooperating merchant list;

FIG. 7 is a flowchart illustrating a method for providing e-receipts to customers, in accordance with embodiments of the disclosure using a participating customer list; and FIG. 8 is a flowchart illustrating a method for providing e-receipts to customers, in accordance with embodiments of the disclosure based on customer identity.

DETAILED DESCRIPTION OF EMBODIMENTS OF THE INVENTION

Embodiments of the present disclosure now may be described more fully hereinafter with reference to the accompanying drawings, in which some, but not all, embodiments of the disclosure are shown. Indeed, many different forms may be possible and the disclosure should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

Furthermore, the term "product" or "account" as used herein may include any financial product, service, or the like that may be provided to a customer from an entity that subsequently requires payment. A product may include an account, credit, loans, purchases, agreements, or the like between an entity and a customer. The term "relationship" as used herein may refer to any products, communications, correspondences, information, or the like associated with a customer that may be obtained by an entity while working with a customer. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity.

In the past few years, there has been an increase in the amount of electronic information provided by merchants to customers regarding purchase of products and services. In the online purchase context, various electronic communications may be provided to the customer from the merchant relative to a purchase. For example, the merchant may provide the customer an electronic order confirmation communication following an online purchase. The order confirmation may be sent to the customer's computer and displayed in a web browser application. The web browser application typically allows the customer to print a hard copy of the order confirmation and to save the confirmation electronically. The merchant will also typically send an email containing the order confirmation to the customer's designated email account. The order confirmation is essentially an e-receipt for the online purchase. The order confirmation includes detailed information regarding the products or services purchased. For example, in the case of a product, the order confirmation may include stock keeping unit "SKU" code level data, as well as other parameters, such as order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like. The order confirmation also includes information about the merchant, such as name, address, phone number, web address, and the like. For most online transactions, the merchant will send at least one second communication confirming shipment of the order. The order shipment confirmation is typically also sent via email to the customer and typically includes the same information as the order confirmation, and in addition, shipping date, tracking number, and other relevant information regarding the order and shipment parameters.

Many merchants now also provide e-receipts to customers shopping at brick and mortar locations. In general, at the point of sale, the customer may have previously configured or may be asked at the time of sale as to whether she wishes to receive an e-receipt. By selecting this option, the merchant will send an electronic communication in the form of an e-receipt to the customer's designated email address. Here again, the e-receipt will typically include a list of services and/or products purchased with SKU level data, and other parameters, as well as information about the merchant, such as name, address, phone number, store number, web address, and the like.

Various merchants now also provide online customer accounts for repeat customers. These online customer accounts may include purchase history information associated with the customer accessible by the customer via ID and passcode entry. Purchase history provides detailed information about services and products purchased by the customer including information found on order confirmations and shipping confirmations for each purchase. Online customer accounts are not limited to online purchases. Many merchants also provide online customer accounts for customers that purchase services and products at brick and mortar locations and then store these transactions in the customer's online account.

For the most part, order confirmations, shipping confirmations, e-receipts, and other electronic communications between merchants and customers are used only by the customer as proof of purchase and for monitoring receipt of purchased items (i.e., for archival purposes). However, there is significant data that can be gleaned from this electronic information for the benefit of the customer, so that the customer may have detailed information regarding purchase history, spending, and the like.

Another development in the past few years has been the growth of online banking, whereby financial institution customers, (such as bank and credit card customers), may view financial account transaction data, perform online payments and money transfers, view account balances, and the like. Many current online banking applications are fairly robust and provide customers with budgeting tools, financial calculators, and the like to assist the customer to not only perform and view financial transaction data, but also to manage finances. A current drawback with online banking is that transactional level detail for a given purchase by the customer is limited. Despite the large amount of information sent by merchants to customers regarding purchases, merchants currently do not provide purchase details to financial institutions. The only information provided to the financial institution is information about the merchant and an overall transaction amount. For example, if a financial institution customer purchases several clothing items from a merchant and uses a financial institution debit card, credit card or check, all that is provided to the financial institution is the merchant information and overall purchase. Product level detail that is present on the receipt provided to the customer by the merchant is not provided to the financial institution.

The lack of detailed information regarding a given transaction in the online banking environment limits a customer's ability to ascertain a larger picture of purchase history and financial transaction information. As a first example, if a customer makes several purchases within a short time period with a particular merchant, all that the customer will see in online banking for each purchase is an overall dollar amount, the merchant name, and date of the purchase transaction. If the customer cannot recall what a particular purchase was for or whether it was a legitimate transaction, the customer cannot view details regarding the purchase via online banking to aid in the inquiry. Instead, the customer must locate and review receipts from the purchases and match them by date and/or total purchase amount to online banking data to perform such analysis.

Lack of detailed purchase information also hinders use of other financial tools available to the customer in online banking, such as budget tools. In general, budget tools divide expenses into various categories, such as food, clothing, housing, transportation, and the like. It is typically advantageous to provide such budget tools with online banking information to populate these various categories with spend information. However, this is difficult where specifics regarding a purchase made by the merchant (such as SKU level data) are not provided by the merchant to the financial institution for a given financial transaction. As many stores provide a wide variety of services and products, such as in the case of a "big box" store that provides groceries, clothing, house hold goods, automotive products, and even fuel, it is not possible to dissect a particular purchase transaction by a customer at the merchant for budget category purposes. For this reason, many current online budgeting tools may categorize purchases for budgeting by merchant type, such as gas station purchases are categorized under transportation and grocery store purchases are categorized under food, despite that in reality, the purchase at the gas station may have been for food or the purchase at the grocery store could have been for fuel. Alternatively, some budget tools may allow a customer to parse the total amount of a purchase transaction between budget categories by manually allocating amounts from the purchase transaction between each budget category. This requires added work by the customer and may be inaccurate if the customer is not using the receipt in making such allocations.

Customer cash purchases are also problematic for integration of customer purchase transactions into online banking. In a cash transaction, the customer may initially withdraw cash from a financial account and then use the money for a purchase. In this instance, the customer's online banking will have no information whatsoever regarding the purchase transaction with a merchant, as there is no communication regarding the purchase transaction between the financial institution and the merchant. For example, if the customer uses cash to purchase fuel at a gas station, the financial institution has no way of determining that the purchase transaction occurred and cannot use such information for notifying customer of spending or budgeting regarding the fuel purchase.

As described above, currently financial institutions are not provided with detailed transaction level information regarding a purchase transaction by a customer from a merchant beyond merchant information and overall transaction price for inclusion in online banking. While detailed data (such as SKU level data) is provided to the customer via receipts, such information is not provided by the merchant to the financial institution. The information is available to the customer but not integratable into a customer's online banking for efficient and increased beneficial use of the information. Currently, a customer must retain her receipts and manually compare such receipts with online purchase transaction data to obtain an understanding of the details of a given purchase transaction.

In light of the above, the current invention contemplates use of e-receipt data and other electronic communication data between a merchant and customer regarding a transaction in order to augment purchase transaction data in online banking. The general concept is to retrieve such electronic communications from the customer, parse the data in these electronic communications, and associate the data from the electronic communications with the corresponding online purchase transaction data.

An initial barrier to integration of electronic communication data received by a customer from a merchant regarding a purchase transaction for inclusion into online banking is data format. Online banking data is in a structured form. Financial institutions currently use a data structure conforming to Open Financial Exchange "OFX" specifications for the electronic exchange of financial data between financial institutions, businesses and customers via the Internet. E-receipts, such as electronic order confirmations, shipment confirmation, receipts, and the like typically do not comply to a uniform structure and are generally considered to include data in an "unstructured" format. For example, while one merchant may provide data in an electronic communication to a customer in one format, another merchant may use a completely different format. One merchant may include merchant data at the top of a receipt and another merchant may include such data at the bottom of a receipt. One merchant may list the purchase price for an item on the same line as the description of the item and list the SKU number on the next line, while another merchant may list the data in a completely opposite order. As such, prior to integration of electronic communications relating to customer purchases into online banking, the data from such electronic communications must be parsed into a structured form.

FIG. 1 is a diagram of an operating environment 10 according to one embodiment of the present disclosure relating to determining parameters for online banking transactions, parsing of data within such online banking transactions into structured data, and generation of e-receipts that may be used by the customer. As illustrated a customer maintains one or more computing devices 12, such as a PC, laptop, mobile phone, tablet, television, or the like that is network enabled for communicating across a network 14, such as the Internet, wide area network, local area network, Bluetooth network, near field network, or any other form of contact or contactless network. Also, one or more network-enabled online banking systems 26 and merchant computing systems 16 may be in the operating environment.

The online banking system 26 is configured to initiate and/or process online banking transactions such as transactions between banks or other financial institutions, transactions between accounts within a financial institution, or the like. For example, the system may be configured to initiate and/or process online banking transactions such as transfer requests, transfer confirmations, online bill pay requests, online bill pay confirmations, retirement account contributions or withdrawals, purchase and/or redemption of equities such as stocks, bonds, or certificates of deposit, or the like. While transfers such as EFT transfers, online transfers, P2P transfers, or others will primarily be discussed, it should be understood that other types of online banking transactions may be initiated and/or processed, e.g., an e-receipt generated, using the system as disclosed herein.

In general, the online banking computing system will monitor actions of a customer on an online portal such as a financial institution web site, email account, customer accounts page, or mobile device application. When the system determines that an online banking transaction has occurred, the system may automatically or on request generate a structured e-receipt to provide information, records, and convenience to the customer. In some embodiments, the system evaluates unstructured e-receipts that have been generated by financial institutions, such as in comma delimited, text, or OFX format, in order to extract data from the e-receipts. The system may be linked to one or more financial institutions via the network 14. In an embodiment, the online banking computing system 26 connects to a financial institution server, such as the merchant computing system 16. In the context of a transfer between two financial institutions, the system may connect to multiple merchant computing systems 16 in order to receive data and/or metadata associated with the online banking transaction from both the transferor and the recipient.

In the context of an online purchase experience, the merchant computing system 16 may be one or more financial transaction servers that, either individually or working in concert, are capable of providing web pages to a customer via the network 14, receiving purchase orders for products, such as stocks or bonds, selected by the customer, communicating with the customer and third party financial institutions to secure payment for the order, and transmitting order confirmation, and possibly confirmation information, to the customer via the network 14 regarding the transaction. In the context of an on-line purchase, the merchant computing system 16 may include a software product for scanning or receiving information about products or services being purchased by the customer and communicating with the customer and third party financial institutions to secure payment for the order. Either the customer computing device or a connected merchant server may be used to communicate order confirmation or purchase confirmation information to the customer related to the purchase transaction. If the customer has an online account with the merchant, the merchant computing system may also log the transaction information into the customer's online account.

In some embodiments, the merchant computing system will provide the customer with information relating to the transaction. In the context of an online purchase, the communications may take the form of purchase order confirmations provided as a web page or as an email or as both. In some embodiments, the merchant computing system may provide a web page purchase order confirmation and advise the customer to either print, electronically save, or book mark the confirmation web page. The order confirmation includes detailed information regarding the products or services purchased, such as for example, in the case of a product, equity name, price per share, asset allocation category, an analysis of the customer's asset allocation, historical price data for the equity, appreciation, SKU code level data, as well as other parameters associated with the product, such as type/category, size, color, and the like, as well purchase price information, information associated with the merchant, and the like. The merchant computing system may also send other subsequent communications, such as communications confirming completion of the order, which typically includes the same information as the purchase order confirmation, and in addition, completion date, tracking number, and other relevant information regarding the order. In the context of an in-store purchase, the merchant computing system may send an e-receipt comprising information similar to that of the purchase order confirmation. In some instances, the customer may actually receive a paper receipt, which the customer may choose to scan into an electronic form and save in a storage device associated with the customer computing device 12.

For a plurality of different transactions, a customer may include online banking transaction related data (e.g., transfer confirmations, transfer requests, online bill pay, scanned receipts, typed or handwritten notes, invoices, bills of sale, and the like) in various locations and in various forms. The transfer related data could be stored in a storage device associated with the customer computing device 12, or in an email server 18, or in a customer's account at the online banking computing system 26. Furthermore, as mentioned, in some embodiments at least a part of the online banking transaction related information is in an unstructured format. Each financial institution may use a customized reporting format for the online banking transactions, whereby various data relating to the transaction may be placed in different sequences, different locations, different formats, and the like for a given financial institution. Indeed, a given financial institution may even use different data formatting and structuring for different communications with the customer (e.g., transfer confirmation, transfer request, online bill pay, equity purchase via a broker, online customer account information, and the like).

In some embodiments, the financial institution may aggregate transaction data from a variety of sources in addition to receiving transaction data directly from merchants. To aggregate and structure data related to online banking transactions, the operating environment further comprises an aggregation computing system 20. The aggregation computing system is operatively connected to at least one of the customer computing device 12, the merchant computing system 16, the online banking computing system 26, and the email server 18 via the network 14. The aggregation computing system is configured to initially search and locate electronic communications associated with online banking transactions made by the customer, in for example, the customer's email, computer storage device, online accounts, and the like. For this purpose, the system may optionally include an authentication/authorization computing system 22 that comprises security IDs and passwords and other security information associated with the customer for accessing customer's email, storage devices, and customer online accounts.

Regarding online banking transaction parameter extraction, aggregation computing system 20 initially gains access to the customer's online banking accounts, email accounts, and the like and retrieves metadata such as message bodies and headers comprising data fields related to the online banking transaction, such as recipient, amount, date/time sent, notes, and the like. In some embodiments, the aggregation computing system accesses the metadata directly. In other embodiments, the aggregation computing system may run search queries of the customer's email account or financial institution database based on known transaction types and/or phrases associated with online banking transactions, such as "receipt," "transfer confirmation," "transfer request," or the like. In some embodiments, the aggregation computing system 20 gains access to a customer's email or accounts information in order to review e-receipts that are generated by financial institutions or other parties related to the online banking transaction. The email or accounts information may also include metadata or keywords that are extracted by the system. Once the keywords metadata are extracted, further filtering may occur to locate relevant online banking transactions. Examples of further filtering may be searches based on known online financial institutions, third parties known to conduct online transactions with the customer, text in the metadata that corresponds to known online banking transaction text, such as the text "transfer," "order," "ordered," "request," "payment," "bill," "invoice," "confirmed," "confirmation," "notification," "receipt," "e-receipt," "ereceipt," "return," "pre-order," "pre-ordered," "tracking," "on its way," "received," "fulfilled," "successful," and the like.

Based on the email, online account, and/or metadata analysis, the data associated with the online banking transaction may then be accessed. The retrieved data for the online banking transactions are parsed to extract the transaction information and/or parameters contained therein. Such parsing operation can occur in a variety of known ways. However, because the text contained in online banking transactions is unstructured (as opposed to the structured tagged elements in a hypertext markup language (HTML) web page which delineate and make recognizable the various fields or elements of the web page), in one embodiment predefined templates are used that have been specifically created to identify the various individual elements or entities of interest in a given online banking transaction from a financial institution. Use of these predefined templates to parse a retrieved online banking transaction occurs within aggregation computing system 20. Because it is known from header information which financial institution is associated with the online banking transaction of interest, a template specific to the financial institution may be used.

The above describes parsing of online transaction confirmations, online transaction requests, or e-receipt data. As mentioned, a customer may scan and save paper receipts, typed or printed notes, invoices, bills of sale, and the like in a storage device or print and save purchase order and transfer confirmation communications sent to the customer by the merchant via a web page. In this instance, the aggregation computing system 20 may first perform optical character recognition "OCR" on the scanned or printed receipts prior to performing the processing performed above. Further, a customer may maintain an online account with a financial institution containing transfer data information. In this instance, the aggregation computing system 20 will access the data online via communication with the online banking computing system to retrieve this data. The aggregation computing system 20 may use column and/or row headers associated with the online data to parse the data, or it may use procedures similar to the above and discussed below to parse the data into appropriate fields.

Returning to data processing procedures, in some embodiments, context-free grammars "CFGs" are used to parse fields from purchase transaction data. In some embodiments, instead of using grammars for parsing natural language (e.g., English) structures, the system may use defined smaller grammars describing a particular message format, for example: "(Successful transfer)(Details about transfer)(Date of transfer)(Remaining balance calculation)," and the like. Further, the CFGs may be individually defined, such as in a Backus-Naur Form (BNF) format, or templates may be used for data extraction. In instances where templates are used, these created templates are grammar and can be converted by known tools, such as Another Tool for Language Recognition "ANTLR", into mail-specific grammars or e-receipt-specific grammars or online customer account information-specific grammars. ANTLR is then used again to convert these grammars into extraction parsers, which can be used by the aggregation computing system 20 to parse the message bodies, metadata, online data, or the like, to extract the entities of interest from them. Examples of such extracted entities include recipient name, recipient account number, transferor name, transferor account number, amount, remaining balance, memo, date, product purchased, payment made, order number, order date, product description, product name, product quantity, product price, product image, hyperlink to the product information on broker website, order total, billing address, confirmation number, and the like.

Other extraction parsers may be used, such as regular expression extraction, which can be used as a brute force pattern matching approach across the information record. With this technique, each word in a given order record is matched against a set of rules. If the rules are met, the piece of text matching the set of rules is returned. For example, shipping companies frequently use a 21 digit tracking number beginning with "1Z" or "91." The aggregation computing system may scan an entire purchase information record to find a 21 digit number with "1Z" or "91" as the first 2 digits. The matched text can then be extracted and used to determine shipping information.

In another embodiment, an HTML document object model (DOM) approach may be used to parse data records. For example, the metadata associated with an online transfer between accounts at different financial institution may include the institution tags. The aggregation computing system may use these tags to identify the institution names and/or accounts. Once relevant information is extracted from online banking transaction, the information is stored in data records in a structured database 24.

As is understood, once the transaction data has been extracted, various information regarding a particular transaction is now known, such as transferor, transferee, amount, remaining balance, online payment, account number, merchant name, merchant web address, transfer number, transfer date, transfer description, and the like. This data can be further enriched with additional and/or updated information associated with products or services within the data. For example, the data may be enriched with transfer information and the like from an online banking computing system 26. In particular, the aggregation computing system may (1) communicate with the merchant computing system 16 and/or online banking computing system 26 to generate e-receipts for online banking transactions within or between financial institutions or other parties, (2) may determine supplemental information associated with the online banking transaction, and/or (3) communicate with the customer regarding improvements or options available to the customer associated with the online banking transaction.

The above is a description of a computing system according to one embodiment of the present invention. An example of an aggregation computing system is described in U.S. Published Patent Application No. 2013/0024525 titled Augmented Aggregation of Emailed Product Order and Shipping Information, the contents of which are incorporated herein by reference.

Turning now to FIG. 2, a high-level flow chart of a system and method for generating an e-receipt for an online banking transaction is provided. In some embodiments, the system includes a computer apparatus including a processor and a memory; and a software module stored in the memory, comprising executable instructions that when executed by the processor cause the processor to: receive an unstructured e-receipt from a financial institution (or other entity such as a merchant), the unstructured e-receipt comprising parameters of an online banking transaction; identify unstructured data associated with the parameters; convert the unstructured data into structured data; and generate an e-receipt for the online banking transaction using at least the structured data.

In block 202, in some embodiments the system receives an unstructured e-receipt from a financial institution, the unstructured e-receipt comprising parameters of an online banking transaction. An unstructured e-receipt is a communication from or by a financial institution that includes data in a format that is not native or accessible to the system. For example, an unstructured e-receipt may be an email from a financial institution acknowledging that a transfer request has completed. The email includes textual information, such as the amount of the transaction and the recipient account of the transaction, but the textual information is not labeled in a structured manner. In other words, the email may include text describing the online banking transaction, but the text is not readily transferable from one format to another or labeled with the subject matter of the text. In some embodiments, the unstructured e-receipt is a confirmation page on a website, such as the confirmation page received after requesting an online transfer. Again, the confirmation page may include textual information and may also include metadata in the html code encoding for the page that describes information about the online banking transaction, but the textual information and the metadata are not accessible or usable by the system without further manipulation. Any type of communication from a financial institution may be considered an unstructured e-receipt.

In an embodiment, the unstructured e-receipt includes parameters of the online banking transaction. Parameters define the characteristics of the online banking transaction. For example, the parameters of the online banking transaction may include the amounts associated with the online banking transaction, the parties associated with the online banking transaction, the data and time associated with the online banking transaction, status of the accounts after completion of the online banking transaction, products associated with the online banking transaction (e.g., equities purchased), any memos or notes associated with the online banking transaction, and the like. As should be understood, online banking transactions may have various parameters and those parameters may change over time. For example, the advent of mobile devices has led to an increase in online banking transactions facilitated through mobile device apps (e.g., P2P transfers). The system may also therefore determine parameters associated with online banking transactions associated with mobile devices, such as the device identifier, the channel, the application, and the like.

In some embodiments, the system determines the parameters by evaluating a list provided by one or more financial institutions, such as the recipient financial institution and the transferor financial institution. The list may be a default list of online banking transaction parameters. In a further embodiment, the parameters are selected or input by the customer so that the parameters of the transaction are customized by the customer.

As used herein, an online banking transaction means a transaction that completes at least some part of the transaction via an online channel. A transaction may be any interaction between one party or account and at least one more party or account. In an exemplary embodiment, a transaction is an online banking transaction such as a transfer of funds between accounts. In some embodiments, the online banking transaction is completed only via online channels such that a paper trail is not created. In further embodiments, the online banking transaction is completed primarily through online channels such that the only steps or activities that do not occur via the online channel are non-material to the online banking transaction.

In block 204, the system identifies unstructured data associated with the parameters. In an embodiment, unstructured data are data that do not comply to a uniform structure. For example, a first financial institution may include data for an online banking transaction in a first format and a second financial institution may use a completely different format for providing information to the customer. In some embodiments, a financial institution will use different formats for different types of communication to a customer. For example, a transfer confirmation acknowledging a transaction may have a first format while a transfer request acknowledging initiation of the transfer may have a second format.

In some embodiments, the unstructured data includes metadata provided by one of the parties associated with the transaction. The metadata is data that are obscure, in a proprietary format, or hidden from view relative to the primary elements of the communication on the transaction. For example, a webpage may display a confirmation receipt for a transfer request. The code behind the webpage, e.g., the html code, may include metadata related to the destination of the transfer request, the account number of the transferring accounts, or the like. In an embodiment, the metadata are not accessible by the customer but is available to a computerized system such as disclosed herein.

In further embodiments, the unstructured data are extracted data from communications from financial institutions. For example, textual data may be extracted using optical character recognition (OCR) technology and/or software. Predictive technologies may also be used to extract information from a diverse set of communications from financial institutions. Metadata may be extracted using html readers and/or OCR technology. In an embodiment, the unstructured data are extracted using a combination of translational and recognition software that both translates the format of the communication (e.g., binary or comma-delimited) and recognizes the structure inherent in the translated communication (e.g., recognizes that the translated word "amount" identifies a parameter of the transaction labeled as the amount).

In an embodiment, the metadata and extracted data include information related to the parameters of the online banking transaction. The metadata may include amount data, party data, memo data, category data, timing data, and product level data. Product level data is information on the products and/or services associated with a transaction. Product level data may include the name of the product, a category for the product, a code associated with the product (e.g., an asset allocation code, a serial number, or the like), and/or required information for the product (e.g., disclosures relating to equities). The metadata separates the transaction from a single non-informational record at the financial institution into a data-rich set that the financial institution, the customer, and/or third parties may use. In some embodiments, the metadata is used to provide appropriate or desirable offers to customers.

In some embodiment, the unstructured data also include transaction level data, such as the date of the transaction, the total amount of the transaction, the location of the transaction, the merchant associated with the transaction (e.g., broker), the category of the merchant, any contact information for the merchant, and the like. In this embodiment, purchase and or sale of equities such as stocks, bonds, mutual funds, and certificates of deposit are primarily considered, although other types of purchases such as insurance policies and the like may also be included. The transaction level data may be present in the metadata and/or in extracted data. For example, the metadata may include the amount of a transfer and the unstructured e-receipt generated by the financial institution may also include a textual depiction of the amount of the transfer.

In some embodiments, the system receives unstructured data from a customer account. In an embodiment, the system receives the unstructured data via a network, such as a wired or wireless network. In an exemplary embodiment, the unstructured data is received via the Internet. For example, the unstructured data may be received via the system accessing a customer's account on an external website, e.g. an email account, an online bill pay account, an online banking account, or the like. In one example, the customer provides the customer's log-in credentials, e.g., username and password, and the system logs into the customer's account to access online banking transaction comprising the unstructured data. In an embodiment, the system logs into the customer's account with the customer's permission and scans the account for unstructured data that may be associated with transaction data. For example, the system may identify a transfer request from a financial institution. The system may also log into a history of the customer's transactions at another financial institution to access unstructured data.

In another embodiment, the customer provides the unstructured data to the system. For example, the customer may forward the transfer confirmation to an email account associated with the system. In one embodiment, the email account associated with the system is unique to the customer. In a further embodiment, the email account is an account that receives unstructured data from more than one customer. For example, a generic account may be set up to receive unstructured data from multiple customers. The system evaluates the unstructured data for both transaction-associated information as well as customer-identifying information.

In some embodiments, the system receives the unstructured data on a regular basis. For example, the system may automatically log into a customer account on a regular basis to determine online banking transaction data. In another embodiment, the system receives the unstructured data after being triggered by the customer. For example, the customer may request an update of unstructured data related to online banking transactions. In another example, the customer completes an online banking transaction via the customer's financial institution and the withdrawal or deposit from the customer's financial account is the trigger that causes the system to receive the unstructured data. The system may determine that an online banking transaction has occurred, determine parameters associated with the online banking transaction, and receive the unstructured data regarding the transaction.

In an embodiment, the customer account is the history of the customer's transactions and other actions with a third party entity, such as another financial institution. For example, some financial institutions keep records of transactions conducted by customers at the financial institution. The customer may be able to access these records, such as by entering a username and password, in order to view a record of the transactions conducted by the customer. In many financial institutions, the records include the parameters associated with the online banking transaction.

In some embodiments, the system determines a format of the unstructured data. The format of the unstructured data is the layout and structure of the communication that embeds the unstructured data. For example, a transfer receipt from a first financial institution may have metadata of a certain format. A second financial institution, however, may have metadata on the transfer in a different format. The system determines the information by evaluating the images in the metadata in the transfer receipt or request and extracting information from the metadata. For example, the system may evaluate hypertext markup language code in the transfer receipt to determine generic codes that a financial institution uses for different types of information. In a further embodiment, the system provider receives information on format of unstructured data from other financial institutions, stores that information in a database, and evaluates metadata from the financial institution by cross-referencing the database.

In an embodiment, the system retains a copy of the format used by a financial institution. For example, many financial institutions use the same format for their online banking transactions with different customers. While the content of the online banking transaction may change, e.g., the amount and destination of the transfer, the format of the online banking transaction remains the same. By saving this format, the system increases the speed with which the system can identify the unstructured data. In an embodiment, the system determines a diagnostic feature of the online banking transaction, such as a financial institution name, and then determines a format for the online banking transaction from a database.

In block 206, the system converts the unstructured data into structured data. In some embodiments, the conversion is based on the format of the online banking communication. Once the system has determined the format of the online banking transaction, the system is able to convert the unstructured data in the communication into structured data that the system may use for many different purposes. For example, the system may determine that transfer request is from a first financial institution using a specific format. The system uses the known format to determine what information in the transfer request to include in the e-receipt, e.g., determines which information in the transfer request should be used to populate fields in the e-receipt. For example, the system may identify the transferor from the metadata in the transfer request and determine that the name of the financial institution.

In block 208, the system generates a structured e-receipt for the online banking transaction using at least the structured data. In an embodiment, a default format for a structured e-receipt is used. The default format may be particular to a specific type of online banking transaction. In other words, a default format for a transfer may be different from a default format for an online bill pay. In another embodiment, the format of the structured e-receipt is customized by the customer, who may select which fields to include in the structured e-receipt. In an embodiment, the system provides a graphical user interface that allows a customer to drag and drop or otherwise input fields into an e-receipt model in order to construct a desired structured e-receipt. As the unstructured data associated with the online banking transaction has been converted into structured data, the system has identified elements of the online banking transaction that correspond to parameters and can input those elements into the structured e-receipt. The structured data is data that shares a common format accessible to the system. As should be understood, the structured data may be stored in a database associated with the system.

In block 210, the system determines a transaction at a financial institution corresponding to the structured e-receipt. In some embodiments, because the transaction is an online banking transaction, the system matches the structured e-receipt to the transaction in the online banking transaction history. In this manner, the system is able to compare the structured e-receipt from the transaction to data associated with transactions at a financial institution, which are also in a structure accessible to the system. It should be understood that the structured e-receipt and the transaction in the transaction history do not necessarily have every parameter be the same. For example, the date that a transfer request initiated from a first financial institution may differ from the date that the transfer request completed at a second financial institution. The system matches the online banking transaction structured e-receipt to the online banking transaction in the transaction history within a level of error that allows for minor deviations in the details of the transaction.

In block 212, in some embodiments the system associates the structured e-receipt with the transaction at the financial institution. By associating the structured e-receipt with the transaction, the system makes the structured e-receipt available to the customer. For example, the customer may go to the customer's account register and be able to select a link to view the structured e-receipt associated with the line item transaction. The association may also facilitate sharing and/or categorizing of the structured e-receipt or transaction.

In block 214, in some embodiment the system provides the structured e-receipt to the customer or a third party on behalf of the customer. The structured e-receipt may be provided in an electronic format or in a hard copy. In an embodiment, the structured e-receipt may be downloaded, emailed, or otherwise communicated to the customer or to a third party at the request of the customer. In some embodiments, the structured e-receipt maintains the structured data format within the structured e-receipt so that the data in the structured e-receipt may be extracted and used with software that recognizes the structured data. For example, the customer may push a structured e-receipt of an equity purchase to a tax planner to assist the tax planner with completing the customer's taxes. The tax planner may have software that extracts the structured data from the structured e-receipt and thereby receive the parameters of the online banking transaction, which otherwise may be difficult to determine.

In a further example, the structured e-receipt is provided to a financial institution as evidence of transaction history when qualifying for a loan. For example, when qualifying for a mortgage often the lender requires information on all transfers into and/or out of the customer's accounts. By providing structured e-receipts to the lender, including in some embodiments e-receipts with structured data, the customer may ease the process of qualifying for a loan by providing comprehensive data on transfers to the lender.

Turning now to FIG. 3, an exemplary embodiment of a structured e-receipt associated with the method is provided. In this example, the structured e-receipt 300 is an e-receipt for an online banking transfer between two accounts that is generated by the system. As discussed, the system generates the structured e-receipt based on at least some of the unstructured data that has been converted to structured data. The unstructured data may be extracted from metadata or extracted data associated with the online banking transaction. In some embodiments, the structured e-receipt includes various types of information including: (a) financial institution information; (b) transaction information; and (c) supplementary information. While this example includes at least some of each type of information, it should be understood that the structured e-receipt does not necessarily require each type of information. For example, the supplemental information may be missing but the system and method may still be able to generate a structured e-receipt including financial institution information and transaction information.

The financial institution information may include the financial institution name 302, as shown. In further embodiments, additional financial institution information is included in the e-receipt, such as contact information, address, institution type or category, internet information for the financial institution such as web address, and the like. The financial institution information can be used to assist in determining the format of the unstructured data within the metadata. For example, the system may determine the financial institution's name, cross-reference the name with a format stored in the database, and use the stored format to generate the e-receipt.

The transaction information may also be included in the e-receipt. In some embodiments, a summary of the online banking transaction is provided in the receipt. The summary may include the amount of the transaction, the recipient, and the date of the transaction. In some embodiments, the e-receipt also includes fields for the amount of the transaction 304, the date of the transaction 306, the recipient of the transaction 308 (e.g., the transferee), the remaining balance in the account after the transaction 310, any memos provided by one or more parties to the transaction 312, the frequency of occurrence of the transaction 314, and the like. In further embodiments, the transaction information may include the transaction time, the transaction location, the channel for payment of products associated with the transaction (e.g., EFT transfer, online bill pay, wireless P2P transfer, or the like), or other information associated with the transaction generally.

The supplementary information may include analysis of the online banking transaction and suggestions or offers from the merchant based on the analysis 316. For example, the system may compare details of the e-receipt to previous actions and/or transactions by the customer. In one embodiment, the system matches the details to the e-receipt, such as the amount and the recipient, to different transactions by the user in order to find matching or similar transactions. In an exemplary embodiment, as shown, the system is able to identify recurring transactions and suggest implementing an automatic online banking transaction to provide convenience to the customer. In some embodiments, the comparison between the online banking transaction that is the subject of the e-receipt and earlier transactions is based on a statistical analysis of the similarities between the e-receipt and other transactions or e-receipts.

The system may determine the corresponding transactions by comparing elements of the structured data and the previous transaction data. For example, the amount, the date, the financial institution, and/or the location may be used to determine a corresponding transaction. In some embodiments, the system determines corresponding transactions within a certain confidence level, such as by determining a likelihood that the structured data and the transaction would share selected elements at random. When the likelihood is very small e.g., below a predetermined threshold, that the similarities between the structured data and the transaction would occur at random, the system determines that the structured data corresponds to the transaction.

In a further embodiment, the system also assists the customer in categorizing online banking transactions based on the e-receipt. For example, the system may prompt and/or suggest the customer to categorize the e-receipt. In some embodiments, the system analyzes components of the e-receipt to suggest a category. For example, the system may analyze the memo field, the recipient field, the date field, or a combination of the fields to determine a likely, based on statistical analysis, e.g., >95% confidence, that the online banking transaction is associated with a specific category such as rent, mortgage, credit card payment, retirement account investment, equity purchase, or the like. The system coordinates with online budgeting software to assist the customer in managing categorization of online banking transactions.

In FIG. 4, an exemplary screenshot of an account register at a financial institution is provided, in accordance with an embodiment of the invention. The account register 400 may include various information pages, such as pages on accounts 402, transfers 404, and customer service 406. In some embodiments, the accounts pages include information on transactions in various accounts, e.g., checking, credit card, savings, investment, and the like. In some embodiments, the transfers page 404 includes information on online banking transactions such as transfers, online bill pays, equity purchases, and the like. For example, the transfers page 404 may include the date 408 that a transaction occurred or cleared, a description of the transaction 410, the amount of the transaction 412, and the balance 414 of the account after the transaction clears.

The date of the transaction may be the actual date that the transaction occurred, the date that the financial institution received notice of the transaction, an indication that the transaction is still in processing, or some other date associated with the transaction. For example, a transfer request may occur on the date that it is received. In contrast, an online bill pay request may occur on a first day and the confirmation of the receipt may clear on a second day.

As discussed the description in the transaction register is typically very general. In some embodiments, the transaction register is updated with information based on the system. For example, the customer may select 416 a transaction, e.g., select a radio button or the like, and information or offers 418 determined by the system may be presented to the customer in the transfer page 404. In some embodiments, offers are also provided to the customer. For example, links to offers may be presented on the transfer page, pop-up windows may present offers, or the like.

As discussed, financial institution do not receive detailed information on transactions from financial institutions. Instead, as shown, the transfer page discloses high-level information such as the channel by which the transaction occurred. For example, the channel may include a transfer, an online bill pay, a credit or the like.

According to various embodiments of the invention, a financial institution may accept enrollment from customers and/or merchants into a point of transaction e-receipt communication program whereby enrolled merchants communicate transaction data and/or e-receipts to the financial institution for aggregation and communication of e-receipts to the enrolled customers. The financial institution can then provide e-receipts to the customer over a variety of channels such as over email, online banking, mobile application or otherwise without necessarily needing access to a customer's email inbox for gathering transaction data. Of course, in some cases, the financial institution may also gain access to the customer's email inbox or other sources of data to supplement the transaction data received from merchants enrolled in the program.

In various embodiments, a customer may be invited to enroll in the program at the point of sale or point of transaction (POT). The POT may present the customer, during or after the transaction, an invitation to enroll in the program. The merchant, for example, may present a message to the customer at the POT describing the program and inviting the customer to participate. In some cases, the customer of the merchant may not be a customer of the financial institution administering the program, in which case, the customer may become a customer of the financial institution or only enroll in the program by providing sufficient personal information for the financial institution to determine the customer's identity and associate it with transaction data from merchant transactions.

One benefit of the program is to centralize aggregation and communication of e-receipts for customer and prospective customer so that the customers may get a comprehensive view of their e-receipts from an online banking or mobile application.

Referring now to FIG. 5, a flowchart illustrates a method 500 for providing e-receipts to customers. The first step, represented by block 502, is to receive authorization from a customer for the customer to be enrolled in a point of transaction e-receipt communication program. The next step, represented by block 504, is to receive transaction data corresponding to at least one transaction performed by the customer at a point of transaction of a merchant. The final step, represented by block 506, is to initiate communication, to the customer, of an e-receipt based at least in part on the received transaction data.

Referring now to FIG. 6, a flowchart illustrates a method 600 for providing e-receipts to customers using a cooperating merchant list. The first step, represented by block 602, is to access a cooperating merchant list including information corresponding to a plurality of merchants cooperating with a financial institution implementing the point of transaction e-receipt communication program. The next step, represented by block 604, is for each of the plurality of cooperating merchants, request authorization from the customer for transaction data associated with any transactions performed by the customer at the cooperating merchant to be communicated to the financial institution for the purpose of providing e-receipts to the customer. The next step, represented by block 606, is to receive authorization from a plurality of enrolling merchants for enrollment in the point of transaction e-receipt communication program. The final step, which may be performed earlier than some or all the other steps discussed with reference to FIG. 6, is to build, based on the enrolling merchants, the cooperating merchant list including information corresponding to the cooperating merchants.

Referring to FIG. 7, a flowchart illustrates a method 700 for providing e-receipts to customer using a participating customer list. The first step, represented by block 702, is to receive customer identification information from the merchant. Next, represented by block 704, is to access a participating customer list including information corresponding to a plurality of customers participating in the point of transaction e-receipt communication program. Next, as represented by block 706, is to determine whether the received customer identification information corresponding to any of the plurality of customers in the participating customer list. Finally, as represented by block 708, the next step is to, if the customer identification information corresponds to any of the customers in the list, initiate communication of a confirmation message to the merchant indicating to the merchant that the customer is participating in the point of transaction e-receipt communication program.

Referring now to FIG. 8, a flowchart illustrates a method 800 for providing e-receipts to customers based on customer identity. The first step, represented by block 802, is to receive customer identification information. For example, a loyalty card, membership card or the like may provide customer identification information to the merchant, which communicates the customer identification information to the financial institution. The next step, represented by block 804, is to determine an identity of the customer based on the received customer identification information. The next step, represented by block 806, is to associate received transaction data with the identity of the customer. The final step, as represented by block 808, is to generate an e-receipt based on the associated transaction data and identity of the customer.

One or more of the steps of FIGS. 5, 6, 7 and/or 8 may be performed by a financial institution system or server. Further, as discussed elsewhere, one or more of the steps may be performed by an acquiring bank system or server and/or a merchant bank system or server.

In various embodiments, the e-receipt is formatted in a format specified by the merchant. In some cases, the merchant accesses the program in order to confirm the identity of the customer and/or to confirm that the customer is enrolled in the program and the merchant communicates the e-receipt to the customer instead of the financial institution communicating the e-receipt to the customer. In some cases, the financial institution provides confirmation to the merchant that the customer is enrolled in the program and the merchant communicates the e-receipt to the customer directly. In some embodiments, the merchant communicates the e-receipt to the financial institution concurrently and the financial institution can then store and aggregate e-receipts for the customers enrolled in the program.

In some embodiments, the merchant enrolled in the program is given an option to choose its own e-receipt design (whether communicated to the customer directly from the merchant and/or from the financial institution) or to choose a standardized e-receipt design and/or financial institution e-receipt design.

In some embodiments a point of transaction or point of sale network of one or more merchants is connected with the financial institution for communicating transaction data and customer identification information to the financial institution for use by the systems disclosed herein. In some instances, more than one network of merchants and/or merchants communicates data to the financial institution and/or some other system for aggregation of the data and use in the program for providing e-receipts to customers.

In various embodiments, a third party that administers a point of transaction or point of sale system at one or more merchant locations and/or administers a point of transaction or point of sale network may aggregate transaction and customer identification information for use in the methods disclosed herein. For example, a third party may administer a point of sale network for a regional grocery store having multiple locations spread across a region. This third party may aggregate information from its POS network and communicate it to a server administered by the financial institution administering the program in order for the server to determine whether the identification information matches a customer participating in the program. If so, the financial institution may communicate one or more e-receipts to the customer based on the customer's preferences. Furthermore, there may be multiple point of sale networks that communicate transaction and customer identification data to one or more financial institution systems for use by embodiments of the invention to communicate e-receipts to customers.

In some embodiments, a payment clearinghouse and/or an acquiring bank or merchant bank may perform some or all of the steps of the methods discussed herein including managing the e-receipt communication program by determining identities of customer and communicating e-receipts to customers. In some cases, the acquiring bank or merchant bank may communicate the e-receipts to the financial institution server, which then stores the e-receipt information and/or communicates the e-receipt to the customer as well. For example, the acquiring bank or merchant bank may provide the e-receipt to the customer and then the financial institution administering the program may provide the e-receipt in an online banking and/or mobile application environment for customer access.

In various embodiments, the database storing the participating (i.e., enrolled) merchant and/or customer lists may be in the cloud and/or may be stored in a proprietary cloud maintained by the financial institution.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A financial institution system for providing e-receipts to customers, the system comprising:
   a computer apparatus including a processor and a memory; and
   a software module stored in the memory, comprising executable instructions that when executed by the processor cause the processor to:
      receive transaction data corresponding to at least one transaction performed by the customer at a point of transaction of a merchant;
      initiate communication, to the customer, of an e-receipt based at least in part on the received transaction data based on authorization from the customer to be enrolled in a point of transaction e-receipt communication program;
      receive customer identification information from the merchant;
      access a participating customer list comprising information corresponding to a plurality of customers participating in the point of transaction e-receipt communication program;
      determine whether the received customer identification information corresponds to any of the plurality of customers in the participating customer list; and
      if so, initiate communication of a confirmation message to the merchant indicating to the merchant that the customer is participating in the point of transaction e-receipt communication program,
      wherein the transaction data is received from the merchant in response to the merchant receiving the confirmation message.

2. The system of claim 1, wherein the executable instructions further cause the processor to:
   request authorization from the customer for the customer to be enrolled in the point of transaction e-receipt communication program.

3. The system of claim 1, wherein the transaction data is received as an e-receipt generated by the merchant and based on the at least one transaction performed by the customer at the point of transaction of the merchant.

4. The system of claim 1, wherein the customer's authorization for the customer to be enrolled in the point of transaction e-receipt communication program is received from an online banking session of the customer.

5. The system of claim 1, wherein the customer's authorization for the customer to be enrolled in the point of transaction e-receipt communication program is received from a mobile application session of the customer.

6. The system of claim 1, wherein the executable instructions further cause the processor to:
   receive authorization from a plurality of enrolling merchants for enrollment in the point of transaction e-receipt communication program; and
   build, based at least in part on the plurality of enrolling merchants, a cooperating merchant list comprising information corresponding to a plurality of cooperating merchants cooperating with a financial institution implementing the point of transaction e-receipt communication program.

7. The system of claim 1, wherein the transaction data corresponds to a cash transaction performed by the customer with the merchant and wherein the executable instructions further cause the processor to:
   receive identification information corresponding to an identity of the customer;
   associate the transaction data with the identity of the customer;
   generate the e-receipt based on the associated transaction data and identity of the customer; and
   wherein initiating communication of the e-receipt to the customer is based at least in part on the determined identity of the customer.

8. The system of claim 1, wherein initiating communication of the e-receipt to the customer comprises initiating communication of the e-receipt to an email address associated with the customer, to an online banking repository associated with the customer and to a mobile application repository associated with the customer.

9. The system of claim 1, wherein the executable instructions further cause the processor to:
   receive, from an online banking session of the customer, a request for an e-receipt associated with the at least one transaction; and
   wherein initiating communication of the e-receipt to the customer is in response to receiving the request.

10. The system of claim 1, wherein the executable instructions further cause the processor to:
   receive, from a mobile application session of the customer, a request for an e-receipt associated with the at least one transaction; and
   wherein initiating communication of the e-receipt to the customer is in response to receiving the request.

* * * * *